United States Patent
Chao et al.

(10) Patent No.: US 7,477,789 B2
(45) Date of Patent: Jan. 13, 2009

(54) VIDEO IMAGE CAPTURING AND DISPLAYING METHOD AND RELATED SYSTEM

(75) Inventors: Tzu-Yi Chao, Hsin-Chu (TW);
Chih-Hung Lu, Hsin-Chu (TW);
Ching-Lin Chung, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 888 days.

(21) Appl. No.: 10/904,705

(22) Filed: Nov. 24, 2004

(65) Prior Publication Data
US 2006/0109339 A1 May 25, 2006

(51) Int. Cl.
*G06K 9/36* (2006.01)
*G06K 9/46* (2006.01)

(52) U.S. Cl. .................. 382/232; 382/233; 382/239

(58) Field of Classification Search ............... 382/232, 382/233, 234, 239, 240, 250; 348/207.1
See application file for complete search history.

(56) References Cited
U.S. PATENT DOCUMENTS
4,598,411 A * 7/1986 Berkovich et al. ......... 375/246

* cited by examiner

*Primary Examiner*—Phuoc Tran
(74) *Attorney, Agent, or Firm*—Winston Hsu

(57) ABSTRACT

A video image capturing and displaying system and related method is disclosed. The system includes an imaging module for capturing a video image consisting of a time series of image frames, each image frame comprising a plurality of sequential lines of pixels; a video image compressing module, comprising at least a first compressing engine and a second compressing engine, for compressing the captured video image; a control unit for actuating one of at least the first compressing engine and the second compressing engine for compressing each specific sequential line; a video image decompressing module for decompressing the compressed video image corresponding to the compressing engine; a first buffer for storing the decompressed video image which is not displayed in time; and a display for displaying the video image based on the stored video image and the decompressed video image.

15 Claims, 4 Drawing Sheets

VIDEO IMAGE CAPTURING AND DISPLAYING METHOD AND RELATED SYSTEM

BACKGROUND OF INVENTION

1. Field of the Invention

The present invention relates to video image processing, and more particularly, to a video image capturing and displaying method and related system.

2. Description of the Prior Art

A video image transferred over a USB, which usually supports only a limited data transfer rate, can consist of as many as tens of thousands of pixels arranged in rows and columns. For example, an eight-bit gray mode video image (one frame) captured by a web camera consists of 352×288 pixels and is around 100 Kbs in size. Image discontinuity is not perceptive to human's eyes if the image display rate is higher than 30 frames per second. However, a USB 1.1 has a data transfer rate of one Mbps and can therefore transfer only 10 frames of the eight-bit gray mode video image per second (100K×10=1M). In order to prevent the image discontinuity from occurring, a video image has to be properly compressed before being transferred over a USB.

Please refer to FIG. 1, which is a block diagram of a video image capturing and displaying system 10 according to the prior art. The video image capturing and displaying system 10 comprises a discrete Cosine transform (DCT) module 12 for transforming a raw video image f(i, j) in spatial domain into a transformed video image F(u, v) in frequency domain, a quantization module 14 for quantizing the transformed video image F(u, v) into a matrix-formed quantized video image Fq(u, v) having low frequency coefficients disposed upper-left while high frequency coefficients disposed lower-right according to a quantization table 16 (non-uniform quantization), a difference pulse code modulation (DPCM) module 18 for generating a DC component of the quantized video image Fq(u, v) by recording only the difference between the quantized video image Fq(u, v) and a quantized video image preceding the quantized video image Fq(u, v) in a zig-zag order and decreasing the code scale of the quantized video image Fq(u, v), a run length encode (RLE) module 20 for generating an AC component of the quantized video image Fq(u, v) by converting consecutive identical characters of the quantized video image Fq(u, v), for example consecutive zeros, into a code consisting of the character and the number making the length of the run, the longer the run, the greater the compression, an entropy coding module 22 connected to the DPCM module 18 and the RLE module 20 for generating a bit-streamed data by modeling and coding the DC and AC components of the quantized video image Fq(u, v) according to a coding table 24, and a buffer 26 of a moderate size for storing the bit-streamed data ready to be transferred over a USB. The bit-streamed data comprises a variety of headers, such as a frame header comprising width/height information and horizontal/vertical sampling factors of the raw video image f(i, j), and a scan header comprising number of components in a scan.

The bit-streamed data generated by the video image capturing and displaying system 10 are transferred via the USB to an image decompression system for recovering the bit-streamed data into the raw video image. The image decompression system decompresses the bit-streamed data in an order reverse to that of a data-compressing process of the video image capturing and displaying system 10, further details hereby omitted.

In contrast to lossless data compressors, such as Huffman, Arithmetic, and LZW used for compressing a text or a program without even a single error introduced, even a single error seriously damaging the meaning of the text or causing the program not to run, the DCT module 12, a so-called lossy data compressor, does not distort the raw video image seriously but introduce some tolerable errors inevitably into the recovered raw video image after the data-compressing and the data-decompressing processes. A trade-off therefore exists between image quality and the degree of compression, i.e. a compression ratio for lossy compression. The greater the compression ratio is, the more distorted the recovered image becomes.

Fortunately, because human's eyes are high frequency roll-off, known video image capturing and displaying systems remove those high frequencies from the transformed video image F(u, v) by adjusting the size of quantization step of the quantization module 14. For example, for uniform quantization, the low frequency coefficients disposed on upper-left corner of the quantized video image Fq(u, v) can be quantized based on a first quantization step, while the high frequency coefficients disposed on lower-right corner of the quantized video image Fq(u, v) are quantized based on a second quantization step having a size larger than that of the first quantization step. Most of the high frequency coefficients are therefore have a value of zero. Alternatively, the coefficients of the quantized video image Fq(u, v) can be quantized based on quantization step of a variable size by looking up a quantization table such as the quantization table 16 for non-uniform quantization.

As mentioned previously, since the USB 1.1 has the data transfer rate of only one Mbps and has to transfer more than 30 frames of image per second to overcome the image discontinuity, and too big (abundance of information) a raw video image cannot be transferred over the USB 1.1 until it has been compressed to be 30 Kb or less in size, a video image capturing and displaying system of the prior art has to comprise a plurality of dedicated components to compress a raw video image and therefore has a bulk size, so as to ensure that any compressed image has a size less than 30 Kb. Accordingly, the buffer 26 of the video image capturing and displaying system 10 has to has a size more than 30 Kb.

There are two kinds of compression mechanisms adopted in the prior art: one is a frame-based compression mechanism, and the other a block-based compression mechanism. The frame-based compression mechanism uses one frame as the basic image compression unit. In other words, all pixels in one frame are compressed under an identical compression mode (the same compression ratio) in the frame-based compression mechanism. This method requires less hardware, is therefore less complicated and more cost effective. However, a group of pixels in one frame usually has different complexity and if these pixels with high complexity are compressed with a low compression ratio, this still leads to too large a compressed video image for transmission over the a USB even after compression. Moreover, the video image capturing and displaying system 10 compresses a raw video image frame by frame, and a compressed video image still having a size larger than 30 Kb cannot be transferred over a USB, so the video image capturing and displaying system 10 has to "dump" too large the whole compressed video image and a hanging phenomenon appears on a display of the video image capturing and displaying system 10. In contrast, if the group of pixels belonging to a simple drawing is compressed with a high compression ratio, the compressed video image has serious distortion.

The block-based compression mechanism, taking one block of a frame as the basic image compression unit, compresses complicated image blocks with a higher compression ratio so that the volume of the compressed data is small enough, and compresses simple image blocks with a lower compression ratio so that the compressed data is more like the raw video image. Although the block-based compression mechanism successfully solves the problems of the frame-based compression mechanism, it divides one frame into blocks and each block unit will be compressed under a specific compression mode. Because the video image capturing and displaying system 10 is designed to display video image according to a line-based order, an additional memory to store these blocks has to be added to the video image capturing and displaying system 10. Therefore, division of one frame increases system hardware and cost. In last, a blocking effect will appear along an edge between any two contagious blocked video images.

SUMMARY OF INVENTION

It is therefore a primary objective of the claimed invention to provide a video image capturing and displaying system and related method to overcome the above-mentioned problems.

According to the claimed invention, the video image capturing and displaying system includes an imaging module for capturing a video image consisting of a time series of image frames, each image frame consisting of a plurality of sequential lines of pixels; a video image compressing module having at least a first compressing engine and a second compressing engine, both of which for compressing the captured video image; a control unit for actuating one of at least the first compressing engine and the second compressing engine for compressing each specific sequential line; a video image decompressing module for decompressing the compressed video image corresponding to the compressing engine; a first buffer for storing the decompressed video image which is not displayed in time; and a display for displaying the video image based on the stored video image and the decompressed video image.

It is an advantage of the claimed invention that the first buffer is small in size. Furthermore, in the present invention, the hanging phenomenon disappears.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
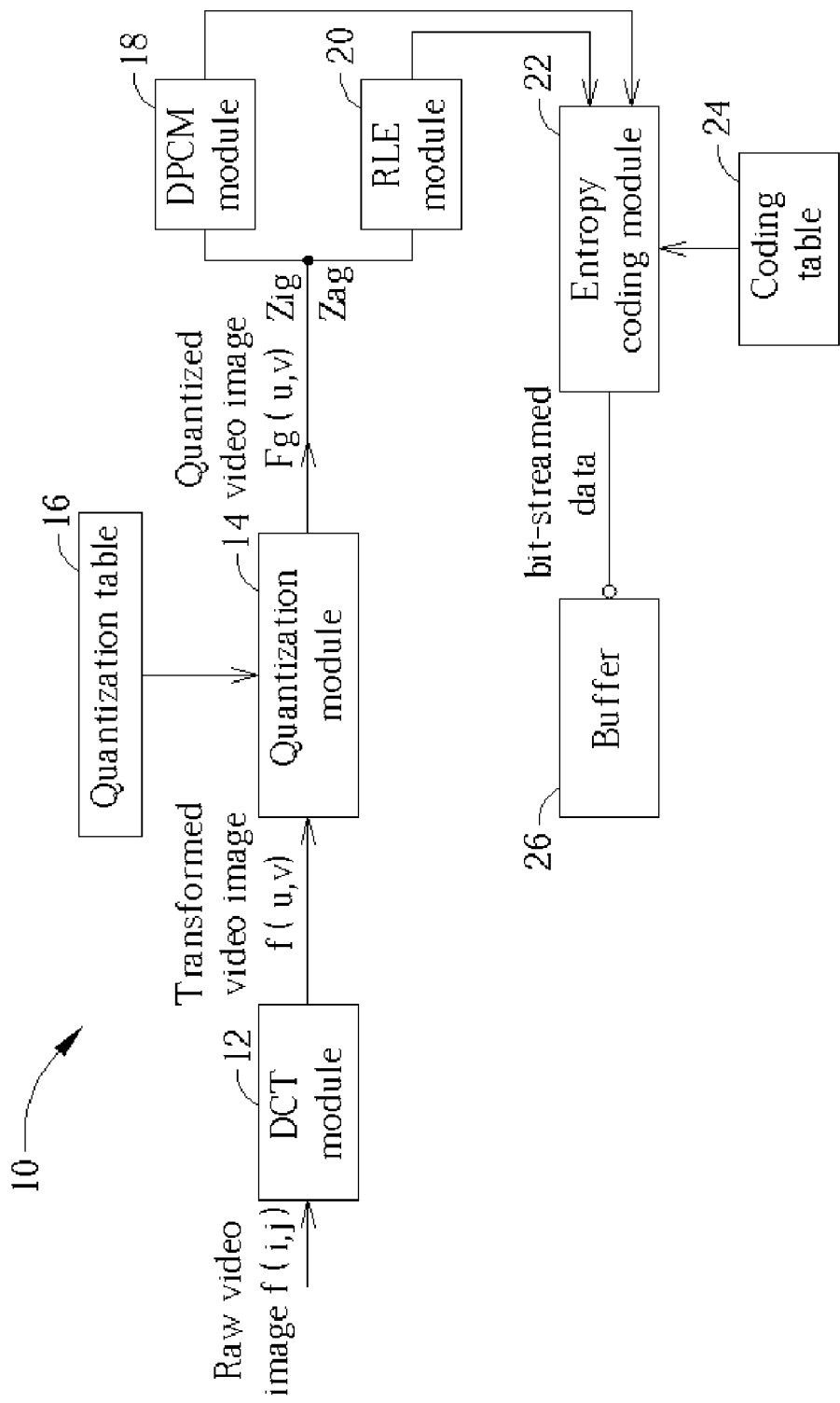
FIG. 1 is a block diagram of a video image capturing and displaying system according to the prior art.
Figure 2:
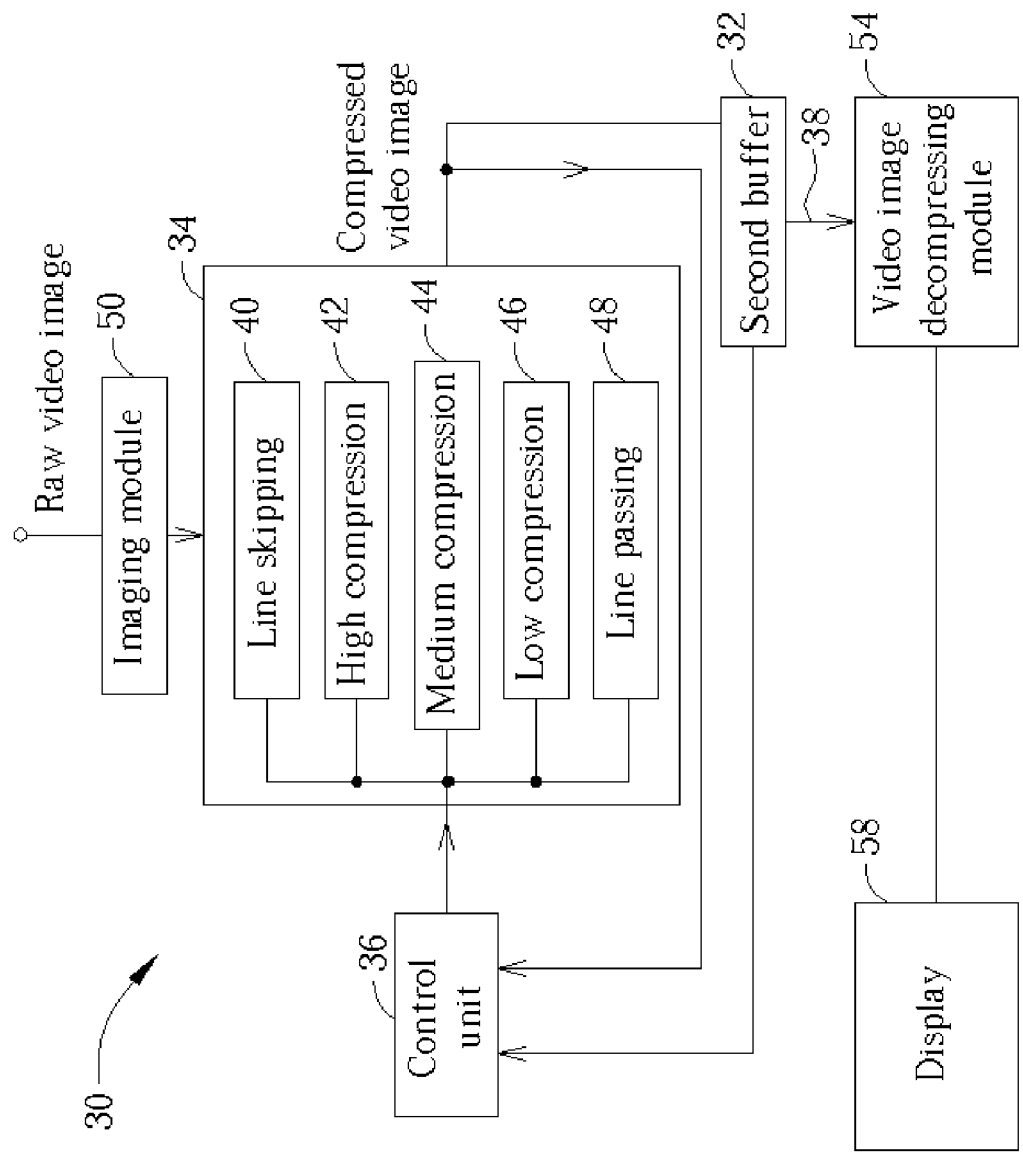
FIG. 2 is a block diagram of a video image capturing and displaying system of the preferred embodiment according to the present invention.

Please refer to FIG. 2, which is a block diagram of a video image capturing and displaying system 30 of the preferred embodiment according to the present invention. According to the preferred embodiment, a raw video image input to the video image capturing and displaying system 30 comprises a time series of image frames, and each of the image frames comprises a plurality of sequential lines of pixels.

The video image capturing and displaying system 30 comprises an imaging module 50 for capturing the raw video image, a video image compression module 34 electrically connected to the imaging module 50 for compressing the raw video image, a control unit 36 electrically connected to the video image compression module 34 for actuating the video image compressing module 34 to compress each specific sequential line of pixels, a second buffer 32 electrically connected between the control unit 36 and the video image compression module 34 for storing compressed video image compressed by the video image compressing module 34, a transmission line 38 electrically connected to the second buffer 32, a video image decompressing module 54 electrically connected to the transmission line 38 for decompressing the compressed video image stored in the second buffer 32 and transmitted over the transmission line 38, and a display 58 electrically connected to the video image decompressing module 54 for displaying the video image based on the decompressed video image.

According to the preferred embodiment, the video image compressing module 34 comprises a plurality of compressing engines: a sequential line skipping unit 40 for skipping a specific sequential line, a high compression ratio unit 42 having a high compression ratio, a medium compression unit 44 having a medium compression ratio smaller than the high compression ratio, a low compression ratio unit 46 having a low compression ratio smaller than the medium compression ratio, and a sequential line passing unit 48 for processing a specific sequential line without compression. The sequential line skipping unit 40, as the name implies, simply "skips" and "ignores" the specific sequential line. The sequential line passing unit 48 equivalently has a compression ratio equal to one.

The high compression ratio unit 42, as well as the medium compression ratio unit 44 and the low compression ratio unit 46, is selected from a group consisting of a discrete cosine transform, a differential pulse code modulation, and a wavelet compression.

The control unit 36 actuates one of the compressing engines of the video image compressing module 34 to compress the video image in a current sequential line according to any one or the combination of a plurality of factors, such as the remaining storage capacity of the second buffer 32, the data length of the compressed video image in a previous sequential line right preceding the current sequential line, the compression ratio (for example, the high compression ratio by the high compression ratio unit 42) in the previous sequential line, and the respective image-compressing capabilities of the compressing engines.

Figure 3:
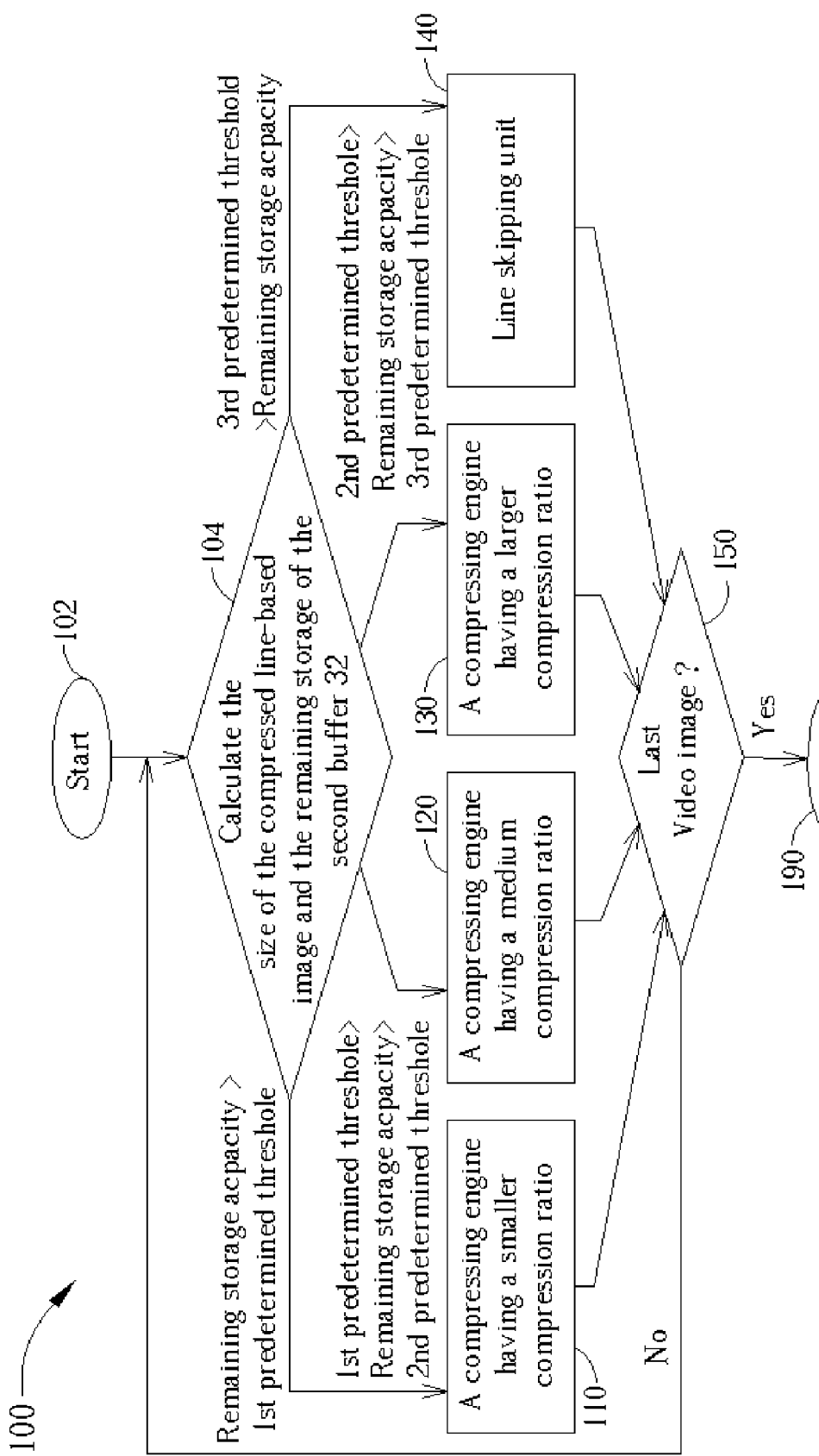
FIG. 3 is a flow chart of a method 100 of the preferred embodiment for demonstrating how the video image capturing and displaying system shown in FIG. 2 compresses a raw video image according to the present invention.

Please refer to FIG. 3, which is a flow chart of a method 100 to demonstrate how the video image capturing and displaying system 30 compresses a raw video image and displays a decompressed video image according to the present invention. The method 100 comprises the following steps:

Step 102: Start;

(The control unit 36 selects and actuates the medium compression ratio unit 44, for example, to compress the video image in the previous sequential line. The video image compressing module 34 (the medium compression ratio unit 44) compresses the video image in the previous line and outputs the compressed video image to the second buffer 32.)

Step 104: The control unit 36 calculates the data length of the compressed video image in the previous sequential line and the remaining storage capacity of the second buffer 32; if the remaining storage capacity of the second buffer 56 is larger in size than the compressed video image in the previous sequential line by a first predetermined threshold (implying that the second buffer 32 still has a spacious storage space left to store a big-sized (full of information) compressed video image), go to step 110; if the remaining storage capacity of the second buffer 32 is larger in size than the compressed video image in the previous sequential line by a second predetermined threshold smaller than the first predetermined threshold (implying that the second buffer 32 only has a moderate storage space left to store a medium-sized compressed video image), go to step 120; if the remaining storage capacity of the second buffer 32 is larger in size than the compressed video image in the previous sequential line by a third predetermined threshold smaller than the second predetermined threshold (implying that the second buffer 32, though, still has some storage space left, but the storage space is not large enough to store too big or even a medium-sized compressed video image), go to step 130; if the remaining storage capacity of the second buffer 32 is smaller in size than the compressed video image in the previous sequential line by the third predetermined threshold, go to step 140;

(The control unit 36 selects and actuates one of the compressing engines of the video image compressing module 34 to compress the video image in the current sequential line according to the data length of the compressed video image in the previous sequential line, the remaining storage capacity of the second buffer 32, and what compressing engine that the control unit 36 has selected to compress the compressed video image in the previous sequential line.)

Step 110: The control unit 36 selects and actuates a compressing engine of the video image compressing module 34 having a compression ratio smaller than that of the medium compression ratio unit 46 to compress the video image in the current sequential line;

(If the control unit 36 calculates that the remaining storage capacity of the first buffer 56 is larger in size than the compressed video image in the previous sequential line by the first predetermined threshold, implying that the second buffer 32 still has plenty of data-storing space available for storing data and is capable of storing a compressed video image in a larger size, and since any two video image in consecutive sequential lines differ slightly and are therefore almost equal in size, the control unit 36 can select and actuate the low compression ratio unit 46, which has a compression ratio smaller than that of the medium compression ratio unit 44, to compress the video image in the current sequential line, without the chance to overflow the second buffer 32.)

Step 120: The control unit 36 selects and actuates a compressing engine of the video image compressing module 34 having a compression ratio approximately equal to (the same as according to the preferred embodiment) that of the medium compression ratio unit 44 to compress the video image in the current sequential line;

(Although the second buffer 32 still has some data-storing space available for storing additional data, the available data-storing space is probably not large enough to store a compressed video image much larger in size than that of the compressed video image in the previous sequential line compressed by the medium compression ratio unit 44 previously, and the control unit 36 can still select and actuate the medium compression ratio unit 44 to prevent the second buffer 32 from being overflowed.)

Step 130: The control unit 36 selects and actuates a compressing engine of the video image compressing module 34 having a compression ratio larger than that of the medium compression ratio unit 46 to compress the video image in the current sequential line;

(The second buffer 32 still has some data-storing space available for storing additional data, yet the small amount of data-storing space is surely not large enough to store a compressed video image much larger in size than the video image in the previous sequential line and is probably not large enough to store a compressed video image approximately equal in size to the compressed video image in the previous sequential line compressed by the medium compression ratio unit 44, so the control unit 36 can still select and actuate the high compression ratio unit 42 to compress the video image in the current sequential line.)

Step 140: The control unit 36 selects and actuates the line skipping unit 40 to compress the video image in the current sequential line;

(If the control unit 36 calculates that the remaining storage capacity of the second buffer 32 is smaller in size by the third predetermined threshold only or even smaller than the compressed video image in the previous sequential line, the control unit 36 has no choice but to actuate the line skipping unit 40 to "compress", in fact to skip and ignore, the video image in the current sequential line, so that the second buffer 32 will receive nothing during a period when the line skipping unit 40 compresses the video image in the current sequential line.)

Step 150: Is the video image in the current sequential line a last video image input to the video image capturing and displaying system 30? If no, go to step 104, else go to step 190; and Step 190: End.

In such a scenario described above, each of the plurality of sequential line-based video image input to the video image capturing and displaying system 30 can be compressed to have a data length as large as possible. In consequence, what the display 58 displays are bit-streamed data full of information, and the video image displayed on the display 58 have good quality and are approximately identical to the raw video image.

In step 110, the control unit 36 selects and actuates the low compression ratio unit 46 to compress the video image in the current sequential line if the remaining storage capacity of the second buffer 32 is larger in size than the compressed video image in the previous sequential line by the first predetermined threshold. Moreover, if the remaining storage capacity of the second buffer 32 is not only larger in size than the video image in the previous sequential line by the first predetermined threshold, but is also larger in size than the compressed video image in the previous sequential line by a fourth predetermined threshold, of course, larger than the first predetermined threshold, the control unit 36 can select and actuate the line passing unit 48 instead of the low compression ratio unit 48 to compress, in fact to "pass" without any compression, the video image in the current sequential line.

Since the video image capturing and displaying system 30 compresses the raw video image line by line, and each of the compressed line-based video images is smaller than one Kb in size, the second buffer 32 therefore can have a size of only two Kbs, a compact size far smaller than that of the buffer 26 of the video image capturing and displaying system 10 of the prior art.

Since the video image capturing and displaying system 30 compresses the raw video image line by line, a compressed video image consisting of a plurality of bit-streamed data probably has a couple of line-based video images already being skipped or dumped off by the control unit 36 in case that too full the second buffer 32 cannot store extra data anymore. However, the video image displayed on the display 58 still contain enough information and can be recovered into a recovered video image approximately identical to the raw video image input to the video image capturing and displaying system 30 by interpolating the skipped line-based video image with certain line-based video images neighboring the skipped line-based video image. The hanging phenomenon disappears.

In the process that the method 100 compresses the video images captured by the imaging module 50, the second buffer 32 outputs the compressed video image compressed by the video image compressing module 34 via the transmission line 38 to the video image decompressing module 54 for decompression continuously. The display 58 displays the video image based on the decompressed video.

Figure 4:
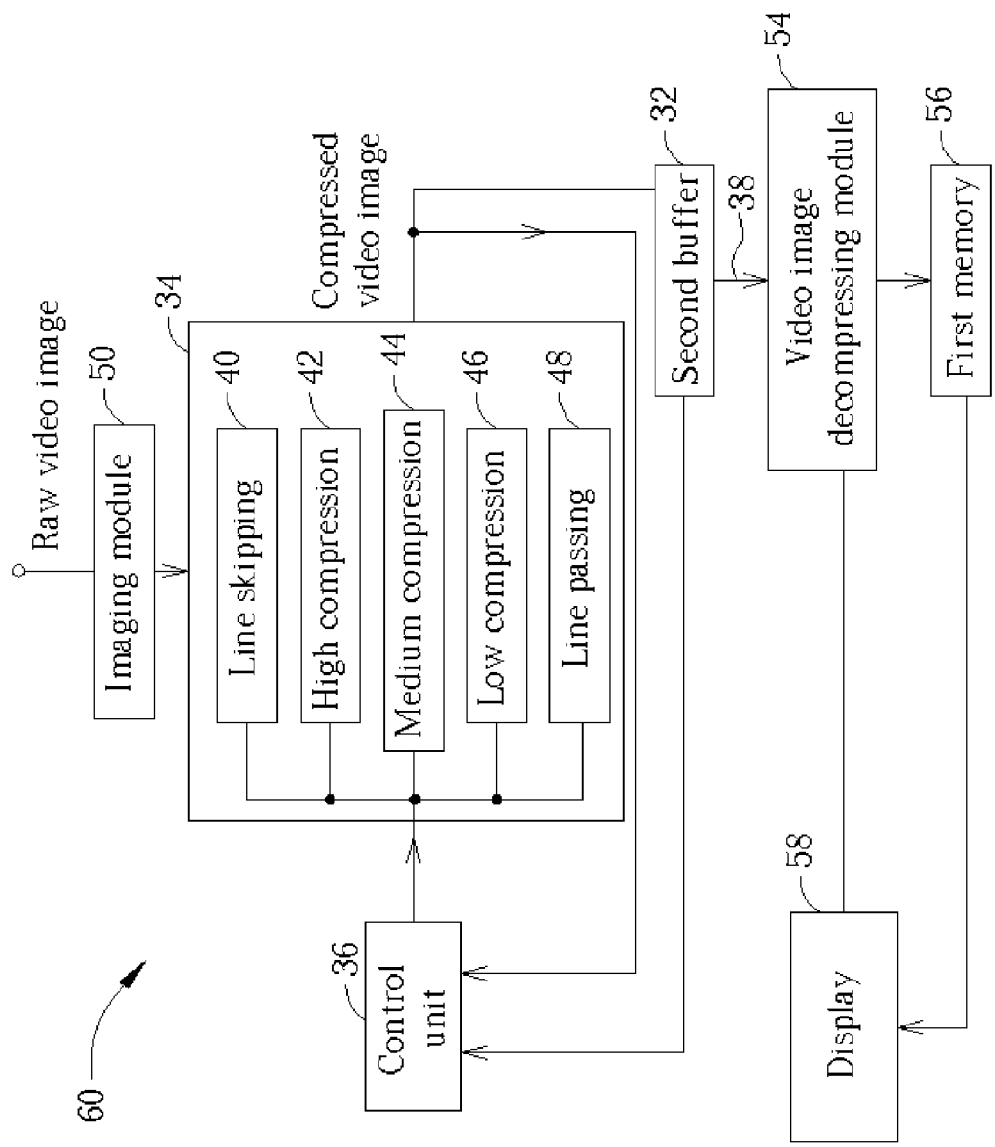
FIG. 4 is a block diagram of a video image capturing and displaying system of a second embodiment according to the present invention.

Please refer to FIG. 4, which is a block diagram of a video image capturing and displaying system 60 of a second embodiment according to the present invention. In addition to the control unit 36, the video image compressing module 34, the second buffer 32, the transmission line 38, the video image decompressing module 54, and the display 58, he video image capturing and displaying system 60 further comprises a first memory 56 electrically connected between the video image decompressing module 54 and the display 58 for storing the decompressed video image not displayed in time by the display 58.

Since the video image capturing and displaying system 60 compresses video images line by line, complying with the displaying mechanism of the display 58, the first memory 56 can be far smaller in size than the memory of a block-based image capturing and displaying system.

Since a PC web camera does not have a great demand on compression ratio, and a compression ration of two to five is usually large enough, a lining effect, similar to the blocking effect existing in the block-based compression mechanism and appearing between any two contagious line-based video images, does not has a severe impact on the quality of the video image displayed on the display 58.

Since the video image capturing and displaying system 30 (and the system 60 as well) compresses the raw video image line by line, and each of the plurality of line-based video images of the raw video image consists of 352, a constant, line-disposed pixels if the raw video image is captured by a PC web camera, a bit-streamed data ready to be transferred over a USB can comprise only a line header for indicating the start of the bit-streamed data. The bit-streamed data has a size smaller than that of the bit-streamed data in the video image capturing and displaying system 10, which compresses the raw video image f(i, j) frame by frame.

In contrast to the prior art, the present invention can provide a video image capturing and displaying system to compress a raw video image line by line according to the data length of a compressed video image in the previous sequential line, the remaining storage capacity of a second, and what video image compressing engine that a control unit of the video image capturing and displaying system has selected and actuated to compress the video image in the previous sequential line. The video image capturing and displaying system of the present invention has at least the following advantages:

1). A data-storing device (the second buffer 32 as well as the first memory 56) can have be smaller in size; and 2). The hanging phenomenon challenging the image discontinuity disappears.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video image capturing and displaying method for a web camera,
   comprising the steps of:
   capturing a video image consisting of a time series of image frames, each image frame comprising a plurality of sequential lines of pixels;
   compressing the captured video image with one of at least a first compressing mode and a second compressing mode for each sequential line as a basic compression unit;
   decompressing the compressed video image corresponding to the compressing mode;
   storing, in a first buffer, the decompressed video image which is not displayed in time; and
   displaying the video image based on the stored video image and the decompressed video image,
   wherein one of at least the first and the second compressing modes for each sequential line is selectively determined according to any one or the combination of the factors consisting of the remaining storage capacity of the first buffer for storing the decompressed video image, a data length of the compressed video image in the previous sequential line and a compression ratio in the previous sequential line.

2. The video image capturing and displaying method of claim 1, wherein the step of compressing the captured video image further comprising a mode of skipping a specific sequential line.

3. The video image capturing and displaying method of claim 1, wherein the step of compressing the captured video image further comprising a mode of processing a specific sequential line without compression.

4. A video image capturing and displaying system, comprising:
   an imaging module for capturing a video image consisting of a time series of image frames, each image frame comprising a plurality of sequential lines of pixels;
   a video image compressing module, comprising at least a first compressing engine and a second compressing engine, for compressing the captured video image;
   a control unit for actuating one of at least the first compressing engine and the second compressing engine for compressing each specific sequential line;
   a video image decompressing module for decompressing the compressed video image corresponding to the compressing engine;
   a first buffer for storing the decompressed video image which is not displayed in time; and
   a display for displaying the video image based on the stored video image and the decompressed video image,
   wherein the control unit actuates the compressing engine according to any one or the combination of the factors consisting of the remaining storage capacity of the first buffer for storing the decompressed video image, the data length of the compressed video image in the previous sequential line, the compression ratio in the previous sequential line and the respective capabilities of the compressing engines.

5. The video image capturing and displaying system of claim 4, wherein one of the compressing engines comprises a sequential line skipping unit to skip a specific sequential line for displaying.

6. The video image capturing and displaying system of claim 4, wherein one of the compressing engines comprises a sequential line passing unit for processing a specific sequential line without compression.

7. The video image capturing and displaying system of claim 4, wherein the first compressing engine and the second compressing engine have compression ratios different from each other, and are selected from the group consisting of a discrete cosine transform, a differential pulse code modulation, and a wavelet compression.

8. The video image capturing and displaying system of claim 4 further comprising a second buffer electrically connected between the video image compressing module and the video image decompressing module for storing the compressed video image compressed by the video image compressing module, the video image decompressing module decompressing the compressed video image stored in the second buffer.

9. The video image capturing and displaying system of claim 8, wherein the control unit further takes a reference to the remaining storage capacity of the second buffer in actuating the compressing engine.

10. A video image capturing and displaying system, comprising:
   an imaging module for capturing a video image consisting of a time series of image frames, each image frame comprising a plurality of sequential lines of pixels;
   a video image compressing module, comprising at least a first compressing engine and a second compressing engine, for compressing the captured video image;
   a control unit for actuating one of at least the first compressing engine and the second compressing engine for compressing each specific sequential line;
   a second buffer for storing video image compressed by the video image compressing module;
   a video image decompressing module for decompressing the compressed video image stored in the second buffer corresponding to the compressing engine;
   a display for displaying the video image based on the decompressed video image,
   wherein the control unit actuates the compressing engine according to any one or the combination of the factors consisting of the remaining storage capacity of the second buffer for storing the decompressed video image, the data length of the compressed video image in the previous sequential line, the compression ratio in the previous sequential line and the respective capabilities of the compressing engines.

11. The video image capturing and displaying system of claim 10, wherein one of the compressing engines comprises a sequential line skipping unit to skip a specific sequential line for displaying.

12. The video image capturing and displaying system of claim 10, wherein one of the compressing engines comprises a sequential line passing unit for processing a specific sequential line without compression.

13. The video image capturing and displaying system of claim 10, wherein the first compressing engine and the second compressing engine have compression ratios different from each other, and are selected from the group consisting of a discrete cosine transform, a differential pulse code modulation, and a wavelet compression.

14. The video image capturing and displaying system of claim 10 further comprising a first buffer electrically connected between the video image decompressing module and the display for storing the decompressed video image not displayed by the display in time.

15. The video image capturing and displaying system of claim 14, wherein the control unit further takes a reference to the remaining storage capacity of the first buffer in actuating the compressing engine.

* * * * *